(12) United States Patent
Materniak et al.

(10) Patent No.: US 7,901,589 B2
(45) Date of Patent: *Mar. 8, 2011

(54) PROPANEDIOL SOIL RESIST COMPOSITIONS

(75) Inventors: Joyce Monson Materniak, Hockessin, DE (US); Edward Patrick Carey, Atglen, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/493,887

(22) Filed: Jun. 29, 2009

(65) Prior Publication Data

US 2010/0327212 A1 Dec. 30, 2010

(51) Int. Cl.
*D06M 15/576* (2006.01)
*D06M 15/00* (2006.01)
*D06M 13/144* (2006.01)
*D06M 13/148* (2006.01)

(52) U.S. Cl. ........................ 252/8.62; 252/8.61; 510/528

(58) Field of Classification Search ................ 252/8.61, 252/8.62; 8/115.6; 510/528
See application file for complete search history.

(56) References Cited

U.S. PATENT DOCUMENTS

| | | | |
|---|---|---|---|
| 4,833,009 A | 5/1989 | Marshall | |
| 4,875,901 A | 10/1989 | Payet et al. | |
| 4,883,839 A | 11/1989 | Fitzgerald et al. | |
| 4,948,650 A | 8/1990 | Fitzgerald et al. | |
| 5,032,136 A | 7/1991 | Fitzgerald et al. | |
| 5,096,747 A | 3/1992 | Scholla et al. | |
| 5,129,947 A | 7/1992 | Sharma et al. | |
| 5,284,902 A | 2/1994 | Huber et al. | |
| 5,370,919 A | 12/1994 | Fieuws et al. | |
| 5,411,766 A | 5/1995 | Kirchner | |
| 5,414,111 A | 5/1995 | Kirchner | |
| 5,460,887 A | 10/1995 | Pechhold | |
| 5,654,068 A | 8/1997 | Pechhold | |
| 5,712,240 A | 1/1998 | Tyerech et al. | |
| 5,712,348 A | 1/1998 | Pechhold | |
| 5,851,595 A | 12/1998 | Jones, Jr. | |
| 6,238,792 B1 | 5/2001 | Pechhold et al. | |
| 6,613,862 B2 | 9/2003 | Clark et al. | |
| 6,646,088 B2 * | 11/2003 | Fan et al. | 528/30 |
| 6,740,251 B2 * | 5/2004 | Materniak et al. | 252/8.62 |
| 6,753,380 B2 * | 6/2004 | Qiu | 525/200 |
| 6,803,109 B2 * | 10/2004 | Qiu et al. | 428/423.1 |
| 7,173,081 B2 | 2/2007 | Von Schmittou et al. | |
| 7,425,279 B2 * | 9/2008 | Cote et al. | 252/8.62 |
| 7,470,745 B2 * | 12/2008 | Peng et al. | 524/589 |
| 2002/0030176 A1 | 3/2002 | Shaffer et al. | |
| 2002/0136803 A1 | 9/2002 | Stefandl | |
| 2005/0043478 A1 | 2/2005 | Huang et al. | |
| 2005/0171279 A1 * | 8/2005 | Cote et al. | 524/871 |
| 2005/0178996 A1 | 8/2005 | Huang et al. | |
| 2008/0103339 A1 | 5/2008 | Bloom | |
| 2008/0113199 A1 * | 5/2008 | Peng et al. | 428/423.4 |
| 2008/0114147 A1 * | 5/2008 | Peng et al. | 528/70 |
| 2009/0072183 A1 * | 3/2009 | Peng et al. | 528/70 |

FOREIGN PATENT DOCUMENTS

| | | |
|---|---|---|
| EP | 797699 | 3/1999 |
| JP | 58-76481 A  * | 5/1983 |
| JP | 1986291501 | 12/1986 |
| JP | 2002332473 | 11/2002 |
| JP | 2005336234 | 12/2005 |
| WO | 9951430 | 10/1999 |
| WO | 02083828 | 10/2002 |
| WO | 2008128419 | 10/2008 |

* cited by examiner

*Primary Examiner* — Anthony J Green

(57) ABSTRACT

A soil resist composition comprises a) a polyfluoro organic compound having at least one urethane or urea, b) 1,3-propanediol, and c) a surfactant, the soil resist composition having freeze thaw stability.

10 Claims, No Drawings

PROPANEDIOL SOIL RESIST COMPOSITIONS

BACKGROUND OF THE INVENTION

Aqueous soil resist compositions containing fluoro organic urethanes have been used to prevent soiling on substrate surfaces and are referred to as soil resist compositions. Examples of these soil resists are in U.S. Pat. No. 5,411,766. These soil resist compositions can be applied at carpet mills by the carpet manufacturer or by the consumer after the installation of the textiles.

Most soil resist composition are stored in totes and transported by trucks to the end use destination. There are times either during storage or transport of the aqueous soil resist compositions that the compositions are exposed to freezing temperatures. Such transport and storage facilities are often not temperature regulated resulting in the composition freezing when exposed during intervals of the sub-freezing temperatures. When the compositions are exposed to freeze thaw cycles, the compositions become instable and start to phase separate, cream, and precipitate out the fluorochemical solids. The soil resist properties are decreased as a result.

It is desirable to have improved soil resist formulations for treatment of fibrous substrates such as carpets during manufacture, and for use in or after cleaning compositions used on soiled carpets that can maintain the soil resist properties and that can also withstand freeze thaw cycles. Such a soil resist formulation would also provide better resistance to soiling.

The present invention comprises a soil resist composition for treatment of fibrous substrates with specific freeze thaw stability and which provides improved soil resist properties.

SUMMARY OF THE INVENTION

The present invention comprises a soil resist composition comprising a) a polyfluoro organic compound having at least one urethane or urea, b) 1,3-propanediol, and c) a surfactant.

The present invention further comprises a method of providing stability to a soil resist composition subjected to freezing and thawing comprising adding 1,3-propanediol to said soil resist composition.

The present invention further comprises a method of imparting soil resistance to a substrate comprising contacting the substrate with a composition comprising a) a polyfluoro organic compound having at least one of urethane or urea, b) 1,3-propanediol, and c) a surfactant.

The present invention further comprises a substrate treated in accordance with the method of the present invention.

DETAILED DESCRIPTION

Trademarks are shown herein in upper case.

The present invention comprises a soil resist composition with freeze thaw protection comprising a) a polyfluoro organic compound having at least one urethane or urea, b) 1,3-propanediol, and c) a surfactant. By "freeze thaw protection" is meant that the composition will be able to withstand being taken below its freezing point for extended periods of time and then above its melting point multiple times without adversely affecting the performance, appearance or stability of the composition. The composition retains its stability and does not undergo phase separation, creaming, precipitation of solids, or other means of disintegration when subjected to one or more freeze thaw cycles. In addition the composition of the present invention provides superior soil resistance to fibrous substrates compared to prior art compositions which do not contain 1,3-propanediol.

By "fluorochemical soil resist compositions" it is meant compositions which provide to substrates treated therewith resistances or repellency to dirt, soil, oil, or other substances not normally intended to be present on the substrate. Fluorochemical soil-resist formulations can include polymers or compounds having pendent or end groups of perfluoroalkyl moieties, fluorosurfactants, or fluoro-intermediates. Examples of fluorochemical soil-resist compositions are commercially available from E.I. du Pont de Nemours and Company, Wilmington, Del.

The following definitions are used by the American Association of Textile Chemists & Colorists (AATCC) in the AATCC Technical Manual, Vol. 77, pp. 409 and 413, 2002, American Association of Textile Chemists and Colorists, Research Triangle Park, N.C. "Soil" is dirt, oil, or other substances not normally intended to be present on a substrate, such as a textile material. "Soiling" in textiles is a method by which a textile substrate becomes more or less uniformly covered with, or impregnated with, soil.

The present invention comprises an improved soil resist composition with freeze thaw protection which also maintains its ability to provide soil resistance to substrates treated therewith. The first component of the soil resist composition of the present invention comprises a) a polyfluoro organic compound having at least one urethane or urea. Any suitable polyfluoro organic compound having at least one urethane or urea linkage can be used herein. Fluorochemical compounds suitable for use in the soil resist composition of the present invention include, for example, the polyfluoro nitrogen-containing organic compounds described by Kirchner in U.S. Pat. No. 5,414,111, which is incorporated herein by reference. The fluorochemical compounds have at least one urea linkage per molecule and are the product of the reaction of: (1) at least one organic polyisocyanate or mixture of polyisocyanates which contains at least three isocyanate groups per molecule, (2) at least one fluorochemical compound that contains per molecule (a) a single functional group having one or more Zerewitinoff hydrogen atoms and (b) at least two carbon atoms each of which contains at least two fluorine atoms, and (3) water in an amount sufficient to react with from about 5% to about 60% of the isocyanate groups in the polyisocyanate. A Zerewitinoff hydrogen is an active hydrogen (such as —OH, —COOH, —NH, and the like) contained in an organic compound. Zerewitinoff hydrogens can be quantified by reacting the compound with a $CH_3Mg$ halide to liberate $CH_4$, which, measured volumetrically, gives a quantitative estimate of the active hydrogen content of the compound. Primary amines give 1 mole of $CH_4$ when reacted in the cold; usually two moles when heated (Organic Chemistry by Paul Karrer, English Translation published by Elsevier 1938, page 135). For purposes of this invention, it is assumed that a primary amine provides one active hydrogen as defined by Zerewitinoff et al.

In a preferred embodiment, the amount of water is sufficient to react with about 10% to about 35% of the isocyanate groups in the polyisocyanate, and most preferably, between about 15% and about 30%.

A wide variety of fluorochemical compounds that contain a single functional group can be used so long as each fluorochemical compound contains at least two carbon atoms and each carbon atom is bound to at least two fluorine atoms. For example, the fluorochemical compound can be represented by the formula:

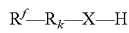

wherein $R^f$ is a monovalent aliphatic group containing at least two carbon atoms, preferably 2 to 20 carbon atoms, more preferably 2 to 6 carbons atoms, each of which is bound to at least two fluorine atoms, and said aliphatic group is optionally interrupted with at least one oxygen atom;

R is a divalent organic radical;

k is 0 or 1; and

X is —O—, —S—, or —N($R^1$)— wherein $R^1$ is H, alkyl containing 1 to 6 carbon atoms or a $R^f$—$R_k$— group.

In a more specific embodiment, the fluorochemical compound that contains a single functional group can be represented by the formula:

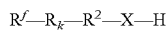

wherein $R^f$ and k are as defined above;

R is the divalent radical: —$C_mH_{2m}$SO—, —$C_mH_{2m}SO_2$—, —$SO_2N(R^3)$—, or —$CON(R^3)$— wherein m is 1 to 22 and $R^3$ is H or alkyl of 1 to 6 carbon atoms;

$R^2$ is the divalent linear hydrocarbon radical: —$C_nH_{2n}$—, which can be optionally end-capped by —(OCH$_2$C($R^4$)H)$_p$—, —(OCH$_2$C(CH$_2$Cl)H)$_p$—, or —C($R^5$)($R^6$)—[OCH$_2$C(CH$_2$Cl)H]$_p$— wherein n is 0 to 12, p is 1 to 50, and $R^4$, $R^5$ and $R^6$ are the same or different H or alkyl containing 1 to 6 carbon atoms; and X is —O—, —S—, or —N($R^7$)— wherein $R^7$ is H, alkyl containing 1 to 6 carbon atoms or a $R^f$—$R_k$—$R^2$— group.

More particularly, $R^f$ is a fully-fluorinated straight or branched aliphatic radical of 2 to about 20 carbon atoms, preferrably 2 to about 6 carbon atoms, and can be interrupted by oxygen atoms.

In a preferred embodiment, the fluorochemical compound that contains a single functional group can be represented by the formula:

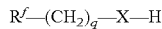

wherein

X is —O—, —S—, or —N($R^7$)— wherein $R^7$ is H, alkyl containing 1 to 6 carbon atoms or a $R^f$—$R_k$—$R^2$— group.

$R^f$ is a mixture of perfluoroalkyl groups, CF$_3$CF$_2$(CF$_2$)$_r$, wherein r is 2 to 18, preferably r is 2 to 4; and q is 1, 2 or 3.

In a more particular embodiment, $R^f$ is a mixture of said perfluoroalkyl groups, CF$_3$CF$_2$(C$_2$)$_r$; and r is 2, 4, 6, 8, 10, 12, 14, 16, and 18. In a preferred embodiment, r is predominantly 4, 6 and 8. In another preferred embodiment, r is predominantly 4.

Representative fluoroaliphatic alcohols that can be used as the fluorochemical compound that contains a single functional group for the purposes of this invention are

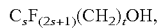

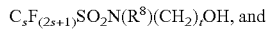

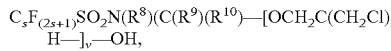

wherein s is 3 to 14; t is 1 to 12; u is 1 to 5; v is 1 to 5; and each of $R^8$ and $R^9$ is H or alkyl containing 1 to 6 carbon atoms.

In another embodiment, the fluorochemical compound that contains a single functional group can be represented by the formula: H(CF$_2$CF$_2$)$_w$CH$_2$OH wherein w is 1 to about 10. The latter fluorochemical compound is a known fluorochemical compound that can be prepared by reacting tetrafluoroethylene with methanol. Yet another such compound is 1,1,1,2,2,2-hexafluoro-isopropanol having the formula: CF$_3$(CF$_3$)CHOH.

In yet another embodiment of the invention, a non-fluorinated organic compound which contains a single functional group can be used in conjunction with one or more of said fluorochemical compounds. Usually between about 1% and about 60% of the isocyanate groups of the polyisocyanate are reacted with at least one such non-fluorinated compound. For example, said non-fluorinated compound can be represented by the formula:

wherein $R^{10}$ is a $C_1$-$C_{18}$ alkyl, a $C_1$-$C_{18}$ omega-alkenyl radical or a $C_1$-$C_{18}$ omega-alkenyl;

$R^{11}$ is —(OCH$_2$C(R$_4$)H)$_p$—, —(OCH$_2$C(CH$_2$Cl)H)$_p$—, or —C($R^5$)($R^6$)—[OCH$_2$C(CH$_2$Cl)H]$_p$— wherein p is 1 to 50, and $R^4$, $R^5$ and $R^6$ are the same or different H or alkyl containing 1 to 6 carbon atoms;

Y is —O—, —S—, or —N($R^7$)— in which $R^7$ is H or alkyl containing 1 to 6 carbon atoms; and k and p are as defined above.

For example, the non-fluorinated compound can be an alkanol or a monoalkyl or monoalkenyl ether or ester of a polyoxyalkylene glycol. Particular examples of such compounds include stearyl alcohol, the monomethyl ether of polyoxethylene glycol, the mono-allyl or -methallyl ether of polyoxethylene glycol, the mono-methacrylic or acrylic acid ester of polyoxethylene glycol, and the like.

Any polyisocyanate having three or more isocyanate groups can be used in the preparation of the fluorochemical compound. For example, one can use

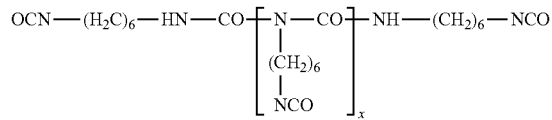

hexamethylene diisocyanate homopolymers having the formula:

wherein x is an integer equal to or greater than 1, preferably between 1 and 8, commercially available for example as DESMODUR N-100, DESMODUR N-75, and DESMODUR N-3200 from Bayer Corporation, Pittsburgh, Pa. Because of their commercial availability, mixtures of such hexamethylene diisocyanate homopolymers are preferred for purposes of this invention. Also of interest are hydrocarbon diisocyanate-derived isocyanurate trimers, which can be represented by the formula:

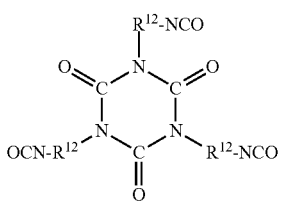

wherein $R^{12}$ is a divalent hydrocarbon group, preferably aliphatic, alicyclic, aromatic or arylaliphatic. For example, $R^{12}$ can be hexamethylene, toluene or cyclohexylene, preferably the former. Other polyisocyanates useful for the purposes of this invention are those obtained by reacting three moles of toluene diisocyanate with 1,1,1-tris-(hydroxymethyl)-ethane or 1,1,1-tris(hydroxymethyl)-propane. The isocyanurate trimer of toluene diisocyanate and that of 3-isocyanatomethyl-3,4,4-trimethylcyclohexyl isocyanate, bis-(4-isocyanatocyclohexyl)methane and diisocyanate trimers of formulas (IIa), (IIb), (IIc) and (IId):

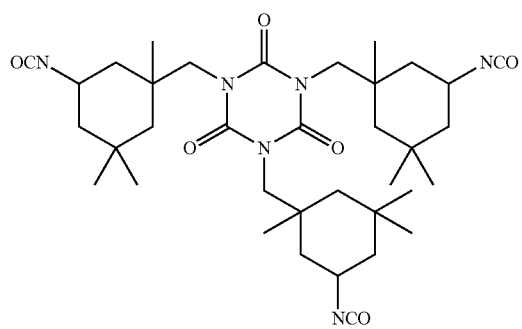

(IIa)

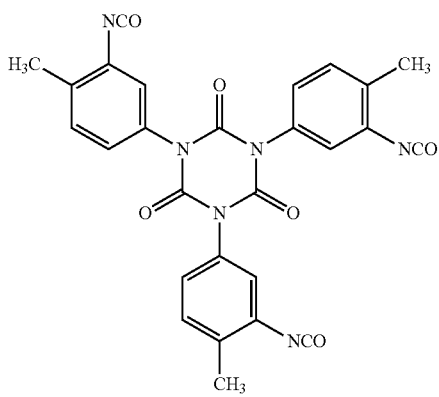

(IIb)

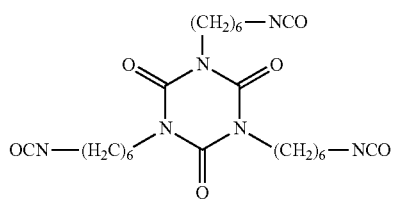

(IIc)

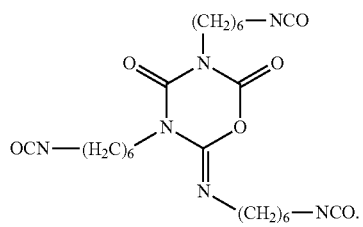

(IId)

are other examples of polyisocyanates useful for the purposes of this invention, as is methine-tris-(phenylisocyanate). The diisocyanate trimers of formulae IIa to IId are available as DESMODUR Z4470, IL, N-3300, and XP2410, respectively, from Bayer Corporation, Pittsburgh, Pa. Also useful for the purposes of this invention is the polyisocyanate having the formula:

The polyfluoro organic compounds used in the invention are prepared by reacting: (1) at least one polyisocyanate or mixture of polyisocyanates which contains at least three isocyanate groups per molecule with (2) at least one fluorochemical compound which contains per molecule (a) a single functional group having one or more Zerewitinoff hydrogen atoms and (b) at least two carbon atoms each of which contains at least two fluorine atoms. Thereafter the remaining isocyanate groups are reacted with water to form one or more urea linkages. Usually between about 40% and about 95% of the isocyanate groups will have been reacted before water is reacted with the polyisocyanate. In other words, the amount of water generally is sufficient to react with from about 5% to about 60 of the isocyanate groups in the polyisocyanate. Preferably, between about 60% and 90% of the isocyanate groups have been reacted before water is reacted with the polyisocyanate, and most preferably between about 70% and 85% of the isocyanate groups have been reacted prior to reaction of water with the polyisocyanate. Thus, in a preferred embodiment the amount of water is sufficient to react with about 10% to about 35% of the isocyanate groups, most preferably between 15% and 30%.

The water-modified fluorochemical carbamates are typically prepared by first charging the polyisocyanate, the perfluoroalkyl compound and a dry organic solvent such as methyl isobutyl ketone (MIBK) to a reaction vessel. The order of reagent addition is not critical. The specific weight of aliphatic polyisocyanate and perfluoroalkyl compounds charged is based on their equivalent weights and on the working capacity of the reaction vessel and is adjusted so that all Zerewitinoff active hydrogens charged will react with some desired value between 40% and 95% of the total NCO group charge. The weight of dry solvent is typically 15% to 30% of the total charge weight. The charge is agitated under nitrogen and heated to 40 to 70° C. A catalyst, typically dibutyltindilaurate per se, or as a solution in MIBK, is added in an amount which depends on the charge, but is usually small, e.g., 1 to 2 parts per 10,000 parts of the polyisocyanate. After the resultant exotherm, the mixture is agitated at a temperature between 65° and 105° C. for 2 to 20 hours from the time of the catalyst addition, and then, after its temperature is adjusted to between 55° and 90° C., is treated with water per se or with wet MIBK for an additional 1 to 20 hours.

The use of a stoichiometric excess of a polyisocyanate assures complete reaction of the fluorinated and non-fluorinated organic compounds that, coupled with subsequent reaction with water, provides fluorochemical compounds that are preferred for use in the soil resist agents of the present invention.

The fluorochemical component used in the composition of the present invention can be used as prepared, or after dilution with solvent, or converted by standard technology to a dispersion in water or in a mixture of water and solvent. While it is usually desirable to minimize organic solvents in soil resist compositions, residual or added solvents such as low molecular weight alcohols or ketones can be used. Preferred for use in the practice of the present invention is an aqueous dispersion optionally containing solvents and dispersion stabilizers such as glycols. The fluorochemical dispersion is combined with the surfactant and propanediol to yield the soil resist composition of the present invention.

In the practice of the present invention, the preferred soil resist composition comprises a polyfluoro organic compound having at least one urethane or urea linkage that is the product of the reaction of: (1) at least one organic polyisocyanate containing at least three isocyanate groups, (2) at least one fluorochemical compound which contains per molecule (a) a single functional group having one or more Zerewitinoff hydrogen atoms and (b) at least two carbon atoms each of which contains at least two fluorine atoms, and (3) water in an amount sufficient to react with from about 5% to about 60% of the isocyanate groups in said polyisocyanate, combined with at least one anionic non-fluorinated surfactant selected from the group consisting of sodium dodecyl diphenyloxide disulfonate, alkyl aryl sulfate, sodium alkyl sulfate, $C_{16}$-$C_{18}$ potassium phosphate, sodium decyl diphenyloxide disulfonate, and a blend of sodium decyl diphenyloxide disulfonate with condensed naphthalene formaldehyde sodium sulfonate.

The second component of the soil resist composition of the present invention comprises component b) 1,3-propanediol. 1,3-propanediol can be produced from petrochemical sources or biological sources. 1,3-Propanediol can be chemically synthesized by the hydration of acrolein or hydroformylation of ethylene oxide to give 3-hydroxypropionaldehyde. The 3-hydroxypropionaldehyde is hydrogenated to give 1,3-propanediol. Alternatively, biologically-based 1,3-propanediol, or bio-based 1,3-propanediol, is produced by fermentation and purification of corn sugars and corn syrup and is commercially available under the trade name SUSTERRA from DuPont Tate & Lyle, BioProducts, LLC, Wilmington, Del. Bio-based 1,3-propanediol can also be made by hydrogenation of corn based glycerol (see US Patent Application 2008/0103339). Bio-based 1,3-propanediol is an environmentally friendly alternative to the petrochemical based 1,3-propanediol because it is made from renewable sources. Either petrochemically based or bio-based 1,3-propanediol, or mixture thereof can be used in the present invention.

The addition of the 1,3-propanediol provides a stable freeze thaw protected soil resist composition. In the present invention, the freeze thaw protected soil resist composition also has improved soil resist properties compared to prior art non-freeze thaw protected compositions that do not contain 1,3-propanediol. The concentration of the 1,3-propanediol suitable for use in the present invention is from about 1% to about 10% by weight, preferably from about 1.5% to about 7% by weight, more preferably from about 2% to about 5% by weight, of the composition The third component of the soil resist composition of the present invention comprises c) a surfactant wherein the surfactant. The surfactant can be anionic, cationic, non-ionic, fluorinated, non-fluorinated or combinations thereof. By "surfactant" it is meant compositions which reduce the surface tension of water; specifically, a surface-active agent which concentrates at oil-water interfaces, exerts emulsifying action, and thus aids in removing soils. Such compounds as alkyl sulfonates, phosphates, glycols, and the like are typically used. Sodium lauryl sulfate, and sodium tripolyphosphate/sodium sesquicarbonate aqueous solutions are preferred surfactants. A particularly preferred surfactant is a mixture of about 90-95% by weight sodium tripolyphosphate and about 5-10% by weight sodium sesquicarbonate (commercially available from Stanley Steemer, Columbus, Ohio). An aqueous solution comprising a mixture of sodium lauryl sulfate, sodium hexadecyl and sodium tetradecyl sulfate (available from Witco as DuPanol WAQE) is also an effective surfactant.

Any anionic non-fluorinated surfactant is useful in the practice of the present invention. These include anionic non-fluorinated surfactants and anionic hydrotrope non-fluorinated surfactants, including but not limited to, sulfonates, sulfates, phosphates and carboxylates. Commercially available anionic non-fluorinated surfactants suitable for use in the present invention include a salt of alpha olefin sulfonate, salt of alpha sulfonated carboxylic acid, salt of alpha sulfonated carboxylic ester, salt of 1-octane sulfonate, alkyl aryl sulfate, salt of dodecyl diphenyloxide disulfonate, salt of decyl diphenyloxide disulfonate, salt of butyl naphthalene sulfonate, salt of $C_{16}$ to $C_{18}$ phosphate, salt of condensed naphthalene formaldehyde sulfonate, salt of dodecyl benzene sulfonate, salt of alkyl sulfate, salt of dimethyl-5-sulfoisophthalate, and a blend of salt of decyl diphenyloxide disulfonate with salt of condensed naphthalene formaldehyde sulfonate. The sodium and potassium salts are preferred. Sodium or potassium salts of dodecyl diphenyloxide disulfonate, alkyl aryl sulfates, salt of alkyl sulfate, $C_{16}$ to $C_{18}$ potassium phosphate, decyl diphenyloxide disulfonate, and a blend of decyl diphenyloxide disulfonate with condensed naphthalene formaldehyde sulfonate are more preferred.

Suitable cationic surfactants for use in the present invention include salts of protonated amines, quaternary ammonium salts, alkyl dimethyl amine oxides, dialkyl methyl amine oxides, and alkyl diamine oxides. Specific examples and preferred examples of cationic surfactants are below, but the practice of this invention is not limited to the specific cited surfactants, which are provided only as examples.

Salts of protonated amines are produced from protonated amines with acids such as, for example, but are not limited to, hydrochloric and acetic (hereinafter abbreviated as HOAc) acids. Preferred salts of protonated amines are alkyl dimethyl amines, dialkyl methyl amines, alkyl ethoxylated amines, alkyl diamines and their ethoxylates.

Quaternary ammonium salts are commonly produced by alkylation of amines. Alkylating agents frequently include, but are not limited to, methyl chloride, dimethyl sulfate, diethyl sulfate, and benzyl chloride. Additional useful cationic surfactants are alkyl trimethyl ammonium salts, dialkyl dimethyl ammonium salts, specifically dialkyl dimethyl ammonium chloride; alkyl methyl ethoxylated ammonium; alkyl dimethyl benzyl ammonium; dialkyl methyl benzyl ammonium; alkyl, alkylamidomethyl, and carboalkoxy pyridinium (with and without ring substitution); alkyl quinolinium; alkyl isoquinolinium; N,N-alkyl methylpyrollidinium; amidoimidazolinium; amido ammonium; and quaternary ammonium salts of alkyl diamines and their ethoxylates.

Additional examples of cationic surfactants include alkyl dimethyl amine oxide, dialkyl methyl amine oxide, and alkyl diamine oxide.

The cationic surfactant is typically selected from the group consisting of at least one of a protonated alkyl dimethyl amine salt, protonated dialkyl methyl amine salt, protonated alkyl ethoxylated amine salt, protonated alkyl diamine salt, protonated alkyl ethoxylated diamine salt, alkyl trimethyl ammonium salt, dialkyl dimethyl ammonium salt, alkyl methyl ethoxylated ammonium salt, alkyl dimethyl benzyl ammonium salt, dialkyl methyl benzyl ammonium salt, alkyl pyridinium salt, alkylamidomethylpyridinium salt, carboalkoxy pyridinium salt, alkyl quinolinium salt, alkyl isoquinolinium salt, N,N-alkyl methylpyrollidinium salt, amidoimidazolium salt, and amido ammonium salt. Alternatively the cationic surfactant is selected from a quaternary ammonium salt of alkyl diamine, ethoxylate of quaternary ammonium salt of alkyl diamine, alkyl dimethyl amine oxide, dialkyl methylamine oxide, and alkyl diamine oxide.

Nonionic surfactants suitable for use in the present invention include condensates of ethylene oxide. Examples of ethylene oxide condensates include condensates with esters of fatty acids and polyhydric alcohols such as, for example, sorbitan esters; with fatty acid alkanol amides, such as, for example, amides of fatty acids and diethanol amine; with alkyl phenols such as, for example, isooctylphenol; with a fatty acid such as, for example, a stearate; with a linear fatty alcohol, with a branched fatty alcohol; and with poly(oxypropylene) block-copolymers. Preferred nonionic surfactants are of formula $C_dH_{(2d+1)}O(CH_2CH_2O)_vH$ wherein d is from about 12 to about 18 and v is from about 5 to about 100. Most preferred nonionic surfactants are polyethoxylated linear alcohols.

The soil resist composition of the present invention further comprises one or more optional components. The present invention further comprises one or more stain resists, one or more salts, one or more pH adjustment additives or buffers, citric acid, poly methyl methacrylate, or combinations thereof.

Commercially available stain resists, other stain resist agents known in the art, or combinations thereof, are suitable for use in the present invention. These preferably comprise a sulfonated phenolic resin or condensate; a partially sulfonated novalac resin; a polymer or copolymer of acrylic acid, methacrylic acid or esters thereof; a carboxylated polymer; a hydrolyzed copolymer of maleic anhydride with olefin or vinyl ether; a hydrolyzed ethylenically unsaturated aromatic/maleic anhydride copolymer; and combinations thereof. Examples are disclosed in U.S. Pat. Nos. 5,851,595 and 6,613,862, each herein incorporated by reference.

Particular examples of stain resist agents include dispersions of a mixture of hydrolyzed maleic anhydride copolymers, sulfonated phenolic resins, and surfactants, prepared as in U.S. Pat. Nos. 4,883,839, 4,948,650 and 5,032,136, each herein incorporated by reference. In particular, mixtures of a hydrolyzed ethylenically unsaturated aromatic/maleic anhydride copolymer, or a hydrolyzed copolymer of an olefin or a vinyl ether with maleic anhydride are preferred. Also preferred is a dispersion of a mixture of hydrolyzed maleic anhydride copolymers, sulfonated phenolic resin, aqueous solution of a partial salt of a hydrolyzed octene/maleic anhydride copolymer, and surfactant as disclosed in U.S. Pat. No. 5,654,068, herein incorporated by reference, as well as mixtures of hydrolyzed maleic anhydride copolymers and sulfonated phenolic resins, or mixtures of hydrolyzed octene/maleic anhydride copolymers and sulfonated phenolic resins.

Another preferred stain resist agent is a dispersion of a sulfonated phenol-formaldehyde condensation product as disclosed and prepared as in U.S. Pat. No. 4,833,009. Other suitable stain resist agents for use herein include hydrolyzed vinyl aromatic-maleic anhydride copolymers and hydrolyzed styrene maleic anhydride copolymers as disclosed in U.S. Pat. No. 5,096,747, those described in U.S. Pat. No. 5,460,887 comprising hydrolyzed styrene/maleic anhydride copolymers; partially sulfonated novalac resins as disclosed in U.S. Pat. No. 4,875,901 and European Patent 797699; those disclosed in U.S. Pat. No. 5,712,348 comprising maleic acid copolymers with fluorinated thioether end-caps; those disclosed in U.S. Pat. No. 6,238,792 comprising maleic acid terpolymers; and combinations thereof. Each of the seven patents recited above in this paragraph are herein incorporated by reference. Several stain resists suitable for use in the present invention are commercially available from E.I. du Pont de Nemours and Company, Wilmington, Del.

Examples of salts useful in the present invention include one or more of an alkali metal salt; alkali metal aryl salt; ammonium salt; ammonium aryl salt; aryl sulfonic acid; urea; amide; alkylamide; dialkylamide; amide of $C_1$ to $C_6$ alkanoic acids or of $C_2$ to $C_6$ alkandioic acids; diamides of $C_2$ to $C_6$ alkandioic acids; cyclic imides of $C_2$ to $C_6$ alkandioic acids; $C_3$ to $C_6$ lactams, or combinations thereof.

The salt used herein is a cation in combination with an anion selected from the group consisting of a sulfate, sulfonate, sulfite, phosphate, borate, chloride, polyphosphate, nitrate, acetate, citrate, benzoate, tetrafluoroborate, tartrate, phthalate, and mono and dialkyl phosphate. Suitable aryl salts are sulfonated aromatic compounds containing from about 6 to about 10 carbon atoms, optionally with alkyl substituents. Preferred aryl sulfonates include sodium aryl sulfonate, potassium aryl sulfonate, sodium toluene sulfonate, and sodium xylene sulfonate. The aryl sulfonates are added as the free sulfonic acids, e.g., p-toluenesulfonic acid, or as their alkali metal salts, preferably the sodium salt.

Any compound, solution or buffer that can adjust the pH of the composition of this invention without adversely affecting the performance of the soil resist can be used. Preferably, urea sulfate or another acid can be used to adjust pH to between about 1 and about 9. Preferably the pH is from about 1.5 to about 5.0, and more preferably from about 1.8 to about 3.0.

The present invention further comprises a method of providing stability to a soil resist composition subjected to freezing and thawing comprising adding 1,3-propanediol to said soil resist composition. The 1,3-propanediol is added at from about 1.0% to about 10% by weight, preferably from about 1.5% to about 7% by weight, more preferably from about 2% to about 5% by weight, of the soil resist composition. Any conventional soil resist composition can be used in this method. Preferred is the soil resist composition of the present invention as described above. The composition treated in accordance with this method and containing the 1,3-propanediol will be able to withstand being taken below its freezing point for extended periods of time and then above its melting point, multiple times without adversely affecting the performance, appearance or stability of the composition. The stability is retained through several freeze thaw cycles. The composition retains its stability and does not undergo phase separation, creaming, precipitation of solids, or other means of disintegration when subjected to one or more freeze thaw cycles. In addition the composition treated in accordance with this method retains its ability to impart soil resistance to fibrous substrates contacted therewith.

The present invention further comprises a method of imparting soil resistance to a substrate comprising contacting the substrate with a composition comprising a) a polyfluoro organic compound having at least one urethane or urea, b) 1,3-propanediol, and c) a surfactant. The soil resist composition of the present invention is contacted with suitable substrates by a variety of customary procedures. It is understood that the soil resist composition can be diluted prior to contacting with the substrate in the present method. For use on fibrous substrates, one can apply the soil resist composition from a dispersion by brushing, dipping, spraying, padding, roll coating, foaming or the like. Other suitable application techniques include exhaustion, flex-nip, nip, skein, winch, liquid injection, immersion, or overlow flood. The soil resist composition can be applied to dyed or undyed substrates, and can also be applied by use of the conventional beck dyeing procedure, continuous dyeing procedure or thread-line application. For paper or leather substrates the method includes addition of the soil resist composition during processing, such as to the paper pulp, or to the leather processing solutions.

The soil resist compositions used in the method of this invention are contacted with the substrate as such, or in combination with other finishes, processing aids, foaming compositions, lubricants, anti-stains, and the like. For textiles such optional additional components include treating agents or finishes to achieve additional surface effects, or additives commonly used with such agents or finishes such as surfactants, pH adjusters, cross linkers, wetting agents, wax extenders, and other additives known by those skilled in the art. Such additional components can comprise compounds or compositions that provide surface effects such as no iron, easy to iron, shrinkage control, wrinkle free, permanent press, moisture control, softness, strength, anti-slip, anti-static, anti-snag, anti-pill, stain repellency, stain release, soil repellency, soil release, water repellency, oil repellency, odor control, antimicrobial, sun protection, cleanability and similar effects. One or more of such treating agents or finishes are applied to the substrate before, after, or simultaneously with the soil resist composition used in the method of the present invention.

The optimal treatment for a given substrate depends on (1) the characteristics of the fluorinated polymer of the present invention, (2) the characteristics of the surface of the substrate, (3) the amount of fluorinated polymer applied to the surface, (4) the method of contacting of the fluorinated polymer onto the surface, and many other factors. Some fluorinated polymers work well on many different substrates, while other fluorinated polymer exhibit superior performance on some substrates or require higher loading levels.

The method of the present invention provides improved resistance to early soiling to the treated substrates versus use of prior art carpet fluorochemical soil resist compositions. The method can be conducted at a mill or manufacturing facility, by a retailer or installer prior to installation, or after installation or sale. In the method of the present invention the soil resist composition can also be applied to a substrate by a pump spray or as an aerosol. When applied as an aerosol, the present invention further comprises a propellant. Any propellant that is compatible with the soil resist composition used in the method of this invention can be employed, including but not limited to hydrocarbons, inorganic gases, or combinations thereof.

The present invention further comprises a substrate treated with a soil resist composition, said composition comprising a) a polyfluoro organic compound having at least one urethane or urea, b) 1,3-propanediol, and c) a surfactant, as described above. Suitable substrates for use with the composition and method of the present invention are fibrous substrates. Fibrous substrates include generally carpet, textiles, leather, paper, and other cellulosics. Examples of such substrates include films, fibers, yarns, fabrics, carpeting, and other articles made from filaments, fibers, or yarns derived from natural, modified natural, or synthetic polymeric materials or from blends of these other fibrous materials. Specific representative examples are cotton; wool; silk; nylon including nylon 6, nylon 6,6 and aromatic polyamides; polyesters including poly(ethyleneterephthalate) and poly(trimethylene-terephthalate) (abbreviated PET and PTT, respectively); poly(acrylonitrile); polyolefins; paper; leather; jute; sisal; and other cellulosics. Further suitable substrates include nonwoven substrates, for example, spunlaced nonwovens, such as SONTARA available from E.I. du Pont de Nemours and Company, Wilmington, Del., and spunbonded-meltblown-spunbonded nonwovens. The soil resist compositions of this invention impart soil resistance properties to fibrous substrates. The preferred substrate of the present invention is carpeting, particularly nylon carpeting, to which soil resist compositions of the present invention are applied.

The compositions, methods, and substrates of the present invention provide several advantages. Compositions of the present invention provide not only improved soil resistance when applied to fibrous substrates, but also provide for freeze thaw stability when exposed to multiple freeze thaw cycles. Thus the compositions can be subjected to a broader variety of conditions and retain stability without a decrease in the soil resistance imparted to substrates. The methods of the present invention provide for improved stability in soil resist agents, and for the treatment of fibrous substrates to impart improved soil resistance. Also provided are fibrous substrates which have better performance when compared to those treated with existing prior art soils resist compositions. The treated substrates have a wide variety of industrial and consumer uses, such as in carpets, draperies, furnishings, fabrics, uniforms, clothing, and other uses, where improved soil resistance is an advantage.

Test Methods and Materials

The following test methods and materials were used in the Examples herein.

Carpet

The carpet used in the Examples 1-6 and 10-11 and Comparative Examples A, B, and G consisted of a residential cut-pile carpet (30 oz/sq.yd., 1.01 kg/sq m), having a nylon 6,6 face fiber that had been dyed to a light blue color, and were previously treated with 1.2% (solids weight on fiber) of SR-500 stain resist, which is available from E.I. du Pont de Nemours and Company, Wilmington, Del., to prevent staining by foods, beverages, and other acid dye type stains.

The carpet used in Examples 14-15 and Comparative Example H consisted of a residential cut-pile carpet (30 oz/sq.yd., 1.01 kg/sq m), having a nylon 6,6 face fiber that had been dyed to a light blue color. The carpet did not have a stain resist treatment.

Test Method 1—Accelerated Soiling Test

A drum mill (on rollers) was used to tumble synthetic soil onto the carpet. Synthetic soil was prepared as described in AATCC Test Method 123-2000, Section 8. Synthetic soil, 3 g, and 1 liter of clean nylon resin beads (SURLYN ionomer resin bead of 3/16 inch (0.32-0.48 cm) diameter were placed into a clean, empty canister (SURLYN is an ethylene/methacrylic acid copolymer commercially available from E.I. du Pont de Nemours and Company, Wilmington, Del.). The canister lid was closed and sealed with duct tape and the canister rotated on rollers for 5 minutes. The soil-coated beads were removed from the canister.

Total carpet sample size was 8×25 inch (20.3×63.5 cm). One test item and one control item were tested simultaneously. The carpet pile of all samples was laid in the same direction. The shorter side of each carpet sample was cut in the machine direction (with the tuft rows). Strong adhesive tape was placed on the backside of the carpet pieces to hold them together. The carpet samples were placed in the clean, empty drum mill with the tufts facing toward the center of the drum. The carpet was held in place in the drum mill with rigid wires. Soil-coated resin beads, 250 cc, and 250 cc of ball bearings, prepared as described above, were placed into the drum mill. The drum mill lid was closed and sealed with duct tape. The drum was run on the rollers for 2½ minutes at 105 rpm. The rollers were stopped and the direction of the drum mill reversed. The drum was run on the rollers for an additional 2½ minutes at 105 rpm. The carpet samples were removed and vacuumed uniformly to remove excess dirt. The soil-coated beads were discarded. The Delta E color difference for the soiled carpet was measured for the test and control items versus the original unsoiled carpet as described in Test Method 2.

Test Method 2—Color Measurement of Soiling Performance

Color measurement of each carpet was conducted on the carpet following the accelerated soiling test. For each test sample and control sample the color of the carpet was measured, the sample was soiled, and the color of the soiled carpet was measured. The Delta E was the difference between the color of the soiled and unsoiled samples, expressed as a positive number. The color difference was measured on each item, using is a Minolta Chroma Meter CR-310. Color readings were taken at five different areas on the carpet sample, and the average Delta E was recorded. The control carpet for each test item was of the same color and construction as the test item.

Delta Delta E was calculated by subtracting the Delta E of the control carpet from the Delta E of the test item. A larger negative value for Delta Delta E indicated that the test carpet had better performance and had less soiling than the control. A larger positive value for Delta Delta E indicated that the test carpet had poorer performance and had soiled more than the control.

Test Method 3—Freeze Thaw Stability Test

The following test procedure was used for testing the freeze-thaw stability of the soil resist compositions. Fifty grams of each sample composition to be tested was placed into a freezer at −16° C. (3.2° F.) for 24 hr. The samples were removed from the freezer and allowed to thaw under room temperature (18-24° C., 65-75° F.). The sample was considered fully thawed when no crystals were present. Once completely thawed, the samples were observed for signs of instability such as phase separation, creaming, sedimentation, and/or coalescence which would indicate a Fail for freeze/thaw stability. Samples were then gently inverted several times and allowed to settle for 1 hour. Samples were observed for any signs of instability such as precipitate or flocculent which would also indicate a Fail for freeze/thaw stability. If the sample remained uniform, it was recorded as a Pass. The freeze thaw procedure was repeated a total of 3 times for each sample.

EXAMPLES

In the following examples the % wpu is the percent of wet pickup, and is the amount of solution applied to the carpet; it is expressed as a percentage of dry weight of the carpet sample prior to processing.

Example 1

A soil resist composition of Example 1 was prepared by blending a polyfluoro organic compound having at least one urethane or urea which was dispersed with anionic surfactant, and 1,3-propanediol, each in the amounts as listed in Table 1. The polyfluoro organic compound employed was prepared as described below. The propanediol employed for this example was a bio-based 1,3-propanediol, sold under the tradename SUSTERRA, commercially available from DuPont Tate & Lyle, Wilmington, Del. The surfactant employed was an anionic surfactant alpha olefin sulfonate, commercially available from Witco, Houston, Tex.

The polyfluoroorganic compound was prepared by first adding the following to a reaction vessel: 1) a hexamethylene diisocyanate homopolymer (DESMODUR N 3300), 2) 3,3,4,4,5,5,6,6,7,7,8,8,8-tridecafluoro-1-octanol (available from E.I. du Pont de Nemours and Company, Wilmington, Del.) in an amount sufficient to react with 65 to 85% of the NCO groups charged, and 3) dry methylisobutylketone in an amount equal to 19% of the total charged weight. The contents of the reaction vessel were agitated under nitrogen and heated to 65° C., whereupon a catalytic amount of dibutyltindilaurate was added. After the resultant exotherm, the reaction mixture was agitated at about 80° C. for 4 hours from the time of the catalyst addition, and then treated with wet methylisobutylketone (3% by weight) in an amount equal to a water mass ratio of 1.13. The diluted mixture was agitated at about 80° C. for an additional 6 hours. The resulting product was dispersed with the anionic surfactant previously named and then blended with the 1,3-propanediol to yield the composition of Example 1.

Example 1 was applied to a carpet as described above, with a spray application at 25% wpu and dried to the carpet face temperature of 250° F. (121° C.). The carpet was tested by Test Methods 1 and 2 for soiling and color measurement and compared against a carpet treated with Comparative Example A, described below. Test results are listed in Table 2. The composition of Example 1 was also tested according to Test Method 3 for freeze thaw stability and results are listed in Table 2.

Example 2

A soil resist composition of Example 2 was prepared by blending a polyfluoro organic compound having at least one urethane or urea which was dispersed with anionic surfactant, and 1,3-propanediol, each in the amounts as listed in Table 1. The polyfluoro organic compound employed that used in Example 1 and was prepared using the process described in Example 1. The propanediol employed for this example was a bio-based 1,3-propanediol, sold under the tradename SUSTERRA, commercially available from DuPont Tate & Lyle, Wilmington, Del. The surfactant employed was an anionic surfactant alpha olefin sulfonate, commercially available from Witco, Houston, Tex. Example 2 was applied to a carpet as described above, with a spray application at 25% wpu and dried to the carpet face temperature of 250° F. (121° C.). The carpet was tested by Test Methods 1 and 2 for soiling and color measurement and compared against a carpet treated with Comparative Example A, described below. Test results are listed in Table 2. The composition of Example 2 was also tested according to Test Method 3 for freeze thaw stability and results are listed in Table 2.

Comparative Example A

Comparative Example A was prepared by blending a polyfluoro organic compound having at least one of a urethane or urea which was dispersed with anionic surfactant in the amounts as listed in Table 1. Comparative Example A did not contain 1,3-propanediol. The polyfluoro organic compound and surfactant employed were the same as used in Example 1. Comparative Example A was applied to a carpet as described above in Example 1. The carpet was tested by Test Methods 1 and 2 for soiling and color measurement and was used as the control carpet for carpets treated with Examples 1 and 2. Test results are listed in Table 2. The composition of Comparative Example A was also tested according to Test Method 3 for freeze thaw stability and results are listed in Table 2.

Example 3

A soil resist composition of Example 3 was prepared by blending a polyfluoro organic compound having at least one urethane or urea which was dispersed with cationic and nonionic surfactants, and 1,3-propanediol, each in the amounts as listed in Table 1. The polyfluoro organic compound employed was that used in Example 1, and was prepared using the process described in Example 1. The propanediol employed for this example was a bio-based 1,3-propanediol, sold under the tradename SUSTERRA, commercially available from DuPont Tate & Lyle, Wilmington, Del. The surfactants employed were cationic surfactant ARQUAD 16-50, commercially available from Akzo Chemicals, Inc., Chicago, Ill., and nonionic surfactant ETHAL TDA-5, commercially available from Ethox Co., Greenville, S.C. Example 3 was applied to a carpet as described above, with a spray application at 25% wpu and dried to the carpet face temperature of 250° F. (121° C.). The carpet was tested by Test Methods 1 and 2 for soiling and color measurement and compared against a carpet treated with Comparative Example B, described below. Test results are listed in Table 2. The composition of Example 3 was also tested according to Test Method 3 for freeze thaw stability and results are listed in Table 2.

Example 4

A soil resist composition of Example 4 were prepared by blending a polyfluoro organic compound having at least one urethane or urea which was dispersed with cationic and nonionic surfactants, and 1,3-propanediol, each in the amounts as listed in Table 1. The polyfluoro organic compound employed was that used in Example 1 and was prepared using the process described in Example 1. The propanediol employed for this example was a bio-based 1,3-propanediol, sold under the tradename SUSTERRA, commercially available from DuPont Tate & Lyle, Wilmington, Del. The surfactants employed were cationic surfactant ARQUAD 16-50, commercially available from Akzo Chemicals, Inc., Chicago, Ill., and nonionic surfactant ETHAL TDA-5, commercially available from Ethox Chemicals, Inc., Greenville, S.C. Example 4 was applied to a carpet as described above, with a spray application at 25% wpu and dried to the carpet face temperature of 250° F. (121° C.). The carpet was tested by Test Methods 1 and 2 for soiling and color measurement and compared against a carpet treated with Comparative Example B, described below. Test results are listed in Table 2. The composition of Example 4 was also tested according to Test Method 3 for freeze thaw stability and results are listed in Table 2.

Comparative Example B

Comparative Example B, a soil resist composition, was prepared by blending a polyfluoro organic compound having at least one urethane or urea which was dispersed with cationic and nonionic surfactants in the amounts as listed in Table 1. Comparative Example B did not contain 1,3-propanediol. The polyfluoro organic compound and surfactants employed were the same as used in Examples 3 and 4. Comparative Example B was applied to a carpet as described above using the method described in Examples 3 and 4. The carpet was tested by Test Methods 1 and 2 for soiling and color measurement and was used as the control carpet for carpets treated with Examples 3 and 4. Test results are listed in Table 2. The composition of Comparative Example B was also tested according to Test Method 3 for freeze thaw stability and results are listed in Table 2.

Example 5

A soil resist composition of Example 5 was prepared by blending a polyfluoro organic compound having at least one urethane or urea which was dispersed with cationic and nonionic surfactants, and 1,3-propanediol, each in the amounts as listed in Table 1. The polyfluoro organic compound employed was that used in Example 1 and was prepared using the process described in Example 1. The propanediol employed for this example was a bio-based 1,3-propanediol, sold under the tradename SUSTERRA, commercially available from DuPont Tate & Lyle, Wilmington, Del. The surfactants employed were cationic surfactant ARQUAD 16-50, commercially available from Akzo Chemicals, Inc., Chicago, Ill., and nonionic surfactant ETHAL TDA-5, commercially available from Ethox Chemicals, Inc., Greenville, S.C. Example 5 was applied to a carpet as described above, with a spray application at 25% wpu. The carpet was then air cured. The carpet was tested by Test Methods 1 and 2 for soiling and color measurement and compared against a carpet treated with Comparative Example C, described below. Test results are listed in Table 2. The composition of Example 5 was also tested according to Test Method 3 for freeze thaw stability and results are listed in Table 2.

Example 6

A soil resist composition of Example 6 was prepared by blending a polyfluoro organic compound having at least one urethane or urea which was dispersed with cationic and nonionic surfactants, and 1,3-propanediol, each in the amounts as listed in Table 1. The polyfluoro organic compound employed was that used in Example 1 and was prepared using the process as described in Example 1. The propanediol employed for this example was a bio-based 1,3-propanediol, sold under the tradename SUSTERRA, commercially available from DuPont Tate & Lyle, Wilmington, Del. The surfactants employed were cationic surfactant ARQUAD 16-50, commercially available from Akzo Chemicals, Inc., Chicago, Ill., and nonionic surfactant ETHAL TDA-5, commercially available from Ethox Chemicals, Inc., Greenville, S.C. Example 6 was applied to a carpet as described above, with a spray application at 25% wpu. The carpet was then air cured.

The carpet was tested by Test Methods 1 and 2 for soiling and color measurement and compared against a carpet treated with Comparative Example C, described below. Test results are listed in Table 2. The composition of Example 6 was also tested according to Test Method 3 for freeze thaw stability and results are listed in Table 2.

Comparative Example C

Comparative Example C, a soil resist composition, was prepared by blending a polyfluoro organic compound having at least one urethane or urea which was dispersed with cat- ionic and nonionic surfactants in the amounts as listed in Table 1. Comparative Example C did not contain 1,3-propanediol. The polyfluoro organic compound and surfactants employed were the same as used in Examples 5 and 6. Comparative Example B was applied to a carpet as described above in Examples 5 and 6. The carpet was then air cured. The carpet was tested by Test Methods 1 and 2 for soiling and color measurement and was used as the control carpet for carpets treated with Examples 5 and 6. Test results are listed in Table 2. The composition of Comparative Example C was also tested according to Test Method 3 for freeze thaw stability and results are listed in Table 2.

TABLE 1

Compositions of Examples and Comparative Examples

| Ex. # | Fluoro chemical % by weight of composition* | Fluoro chemical ppm (micrograms/g) F on fiber | Surfactant Type | Surfactant % by weight (total composition) | 1,3-propanediol % by weight of composition |
|---|---|---|---|---|---|
| 1 | 4% | 500 | Anionic | 0.26% | 1% |
| 2 | 4% | 500 | Anionic | 0.26% | 5% |
| Comp A | 4% | 500 | Anionic | 0.26% | 0 |
| 3 | 4% | 500 | Nonionic | 0.06% | 1% |
|   |    |     | Cationic | 0.15% |   |
| 4 | 4% | 500 | Nonionic | 0.06% | 5% |
|   |    |     | Cationic | 0.15% |   |
| Comp B | 4% | 500 | Nonionic | 0.06% | 0 |
|   |    |     | Cationic | 0.15% |   |
| 5 | 4% | 500 | Nonionic | 0.06% | 1% |
|   |    |     | Cationic | 0.15% |   |
| 6 | 4% | 500 | Nonionic | 0.06% | 5% |
|   |    |     | Cationic | 0.15% |   |
| Comp C | 4% | 500 | Nonionic | 0.06% | 0 |
|   |    |     | Cationic | 0.15% |   |
| Comp D | 4% | 500 | Anionic | 0.26% | 0.5% |
| 7 | 4% | 500 | Anionic | 0.26% | 10.0% |
| Comp E | 4% | 500 | Nonionic | 0.06% | 0.5% |
|   |    |     | Cationic | 0.15% |   |
| 8 | 4% | 500 | Nonionic | 0.06% | 10.0% |
|   |    |     | Cationic | 0.15% |   |
| 9 | 3.56% | 500 | Nonionic | 0.06% | 5% |
|   |    |     | Cationic | 0.15% |   |
| Comp F | 3.56% | 500 | Nonionic | 0.06% | 0% |
|   |    |     | Cationic | 0.15% |   |
| 10 | 4% | 500 | Anionic | 0.96% | 5% |
| 11 | 4% | 500 | Anionic | 0.96% | 1% |
| Comp G | 4% | 500 | Anionic | 0.96% | 0 |
| 12 | 4% | 500 | Anionic | 0.96% | 1.5% |
| 13 | 4% | 500 | Anionic | 0.96% | 2.5% |
| 14 | 4% | 500 | Anionic | 0.96% | 5% |
| 15 | 4% | 500 | Anionic | 0.96% | 1% |
| Comp H | 4% | 500 | Anionic | 0.96% | 0 |

*The percent is on 100% solids basis.

TABLE 2

Performance Results

| Ex. # | Delta delta E* | Freeze/thaw stability 1 cycle | Freeze/thaw stability 3 cycles |
|---|---|---|---|
| 1 | −1.2 | Pass | Pass |
| 2 | −1.1 | Pass | Pass |
| Comp A | 0 | Fail | Fail |
| 3 | −1.9 | Pass | Pass |
| 4 | −1.9 | Pass | Pass |
| Comp B | 0 | Fail | Fail |
| 5 | −1.6 | Pass | Pass |
| 6 | −1 | Pass | Pass |
| Comp C | 0 | Fail | Fail |

*A larger negative number indicates better the performance.

The data in Table 2 shows that Examples 1 to 6, containing the 1,3-propanediol, not only provided freeze thaw stability for 3 freeze thaw cycles, but also provided improved soil resistance when applied to carpet when compared to Comparative Examples A, B and C which did not contain 1,3-propanediol.

Comparative Example D

A soil resist composition of Comparative Example D was prepared by blending a polyfluoro organic compound having at least one urethane or urea which was dispersed with anionic surfactant, and 1,3-propanediol, each in the amounts as listed in Table 1. The polyfluoro organic compound employed was THAT USED IN Example 1 and was prepared using the process described in Example 1. The propanediol employed for this example was a bio-based 1,3-propanediol, sold under the tradename SUSTERRA, commercially available from DuPont Tate & Lyle, Wilmington, Del. The surfactant employed was an anionic surfactant alpha olefin sulfonate, commercially available from Witco, Houston, Tex. The composition Comparative Example A was tested according to Test Method 3 for freeze thaw stability and results are listed in Table 3.

Example 7

A soil resist composition of Example 7 was prepared by blending a polyfluoro organic compound having at least one urethane or urea which was dispersed with anionic surfactant, and 1,3-propanediol, each in the amounts as listed in Table 1. The polyfluoro organic compound employed was that of example 1 and was prepared using the process described in Example 1. The propanediol employed for this example was a bio-based 1,3-propanediol, sold under the tradename SUSTERRA, commercially available from DuPont Tate & Lyle, Wilmington, Del. The surfactant employed was an anionic surfactant alpha olefin sulfonate, commercially available from Witco, Houston, Tex. The compositions of Example 7 and Comparative A were tested according to Test Method 3 for freeze thaw stability and results are listed in Table 3.

Comparative Example E

A soil resist composition of Comparative Example E was prepared by blending a polyfluoro organic compound having at least one urethane or urea which was dispersed with cationic and nonionic surfactants, and 1,3-propanediol, each in the amounts as listed in Table 1. The polyfluoro organic compound employed was that of example 1 and was prepared using the process described in Example 1. The propanediol employed for this example was a bio-based 1,3-propanediol, sold under the tradename SUSTERRA, commercially available from DuPont Tate & Lyle, Wilmington, Del. The surfactants employed were cationic surfactant ARQUAD 16-50, commercially available from Akzo Chemicals, Inc., Chicago, Ill., and nonionic surfactant ETHAL TDA-5, commercially available from Ethox Co., Greenville, S.C. The compositions of Comparative Example E was tested according to Test Method 3 for freeze thaw stability and results are listed in Table 3.

Example 8

A soil resist composition of Example 8 was prepared by blending a polyfluoro organic compound having at least one urethane or urea which was dispersed with cationic and nonionic surfactants, and 1,3-propanediol, each in the amounts as listed in Table 1. The polyfluoro organic compound employed was that of Example 1 and was prepared using the process described in Example 1. The propanediol employed for this example was a bio-based 1,3-propanediol, sold under the tradename SUSTERR, commercially available from DuPont Tate & Lyle, Wilmington, Del. The surfactants employed were cationic surfactant ARQUAD 16-50, commercially available from Akzo Chemicals, Inc., Chicago, Ill., and nonionic surfactant ETHAL TDA-5, commercially available from Ethox Co., Greenville, S.C. The compositions of Example 8 and Comparative B were tested according to Test Method 3 for freeze thaw stability and results are listed in Table 3.

TABLE 3

Performance Results

| Ex. # | Freeze/thaw stability 1 cycle | Freeze/thaw stability 3 cycles |
|---|---|---|
| Comp D | Fail | Fail |
| 7 | Pass | Pass |
| Comp A | Fail | Fail |
| Comp E | Fail | Fail |
| 8 | Pass | Pass |
| Comp B | Fail | Fail |

The data in Table 3 demonstrates that Examples 7 and 8 of the invention containing 1,3-propanediol passed the freeze thaw stability test. Comparative examples A and B, each containing no 1,3-propanediol failed the freeze thaw stability test. Comparative Examples D and E, which contained 1,3-propanediol at a low level of 0.5% by weight, failed the freeze thaw stability test showing that this level is too low to be effective.

Example 9

A soil resist composition of Example 9 was prepared by blending 1) 3.56% of a polyfluoro organic compound having at least one urethane or urea which was dispersed with 0.15% cationic and 0.06% nonionic surfactants, 2) 0.02% additional cationic surfactant, 3) 5% of 1,3-propanediol, and 4) 0.54% polymethylmethacrylate. The polyfluoro organic compound employed was that of example 1 and was prepared as described in Example 1. The propanediol employed for this example was a bio-based 1,3-propanediol, sold under the tradename SUSTERRA, commercially available from DuPont Tate & Lyle, Wilmington, Del. The surfactants employed were cationic surfactant ARQUAD 16-50, commercially available from Akzo Chemicals, Inc., Chicago, Ill., nonionic surfactant ETHAL TDA-5, commercially available from Ethox Co., Greenville, S.C., and cationic surfactant MERPOL HCS, commercially available from Stepan Chemical Company, Northfield, Ill. The composition of Example 9 was tested according to Test Method 3 for freeze thaw stability and results are listed in Table 4.

Comparative Example F

A soil resist composition of Comparative Example F was prepared by blending 1) 3.56% of a polyfluoro organic compound having at least one urethane or urea which was dispersed with 0.15% cationic and 0.06% nonionic surfactants, 2) 0.02% additional cationic surfactant, and 3) 0.54% polymethylmethacrylate. The polyfluoro organic compound employed was that of example 1 and was prepared as described in Example 1. Comparative Example F did not contain 1,3-propanediol. The surfactants employed were cationic surfactant ARQUAD 16-50, commercially available from Akzo Chemicals, Inc., Chicago, Ill., nonionic surfactant ETHAL TDA-5, commercially available from Ethox Co., Greenville, S.C., and cationic surfactant MERPOL HCS, commercially available from Stepan Chemical Company, Northfield, Ill. Comparative Example F was tested according to Test Method 3 for freeze thaw stability and results are listed in Table 4.

TABLE 4

Performance Results

| Ex. # | Freeze/thaw stability 1 cycle | Freeze/thaw stability 3 cycles |
|---|---|---|
| 9 | Pass | Pass |
| Comparative F | Fail | Fail |

Examples 10 and 11

Soil resist compositions of Examples 10 and 11 were prepared by blending 1) 4% of a polyfluoro organic compound having at least one urethane or urea which was dispersed with 0.26% anionic surfactant, 2) 5% of 1,3-propanediol for Example 10 or 1% of 1,3-propanediol for Example 11, 3) 2% polymethylmethacrylate, 4) 0.7% carboxylated polymer available as ZELAN 338 from E.I. du Pont de nemours and Company, Wilmington, Del., 5) 0.7% additional anionic surfactant, and 6) 0.3% citric acid. The polyfluoro organic compound employed was that of Example 1 and was prepared as in Example 1. The propanediol employed for this example was a bio-based 1,3-propanediol, sold under the tradename SUSTERRA, commercially available from DuPont Tate & Lyle, Wilmington, Del. The surfactant employed was anionic surfactant alpha olefin sulfonate and Witcolate WAQE, commercially available from Witco, Houston, Tex. Examples 10 and 11 were applied to a carpet as described above, with a spray application at 25% wpu. The carpet was then air cured. The carpet was tested by Test Methods 1 and 2 for soiling and color measurement and compared against a carpet treated with Comparative Example G, described below. Test results are listed in Table 5. The compositions of Examples 10 and 11 were also tested according to Test Method 3 for freeze thaw stability and results are listed in Table 5.

Comparative Example G

A soil resist composition of Comparative Example G was prepared by blending 1) 4% of a polyfluoro organic compound having at least one urethane or urea which was dispersed with 0.26% anionic surfactant, 2) 2% polymethylmethacrylate, 3) 0.7% carboxylated polymer available as ZELAN 338 from E.I. du Pont de Nemours and Company, Wilmington, Del., 4) 0.7% additional anionic surfactant, and 5) 0.3% citric acid. Comparative Example G did not contain 1,3-propanediol. The polyfluoro organic compound employed was that of Example 1 and was prepared as described in Example 1. The surfactant employed was anionic surfactant alpha olefin sulfonate and Witcolate WAQE, commercially available from Witco, Houston, Tex. Comparative Example G was applied to a carpet as described above, with a spray application at 25% wpu. The carpet was then air cured. The carpet was tested by Test Methods 1 and 2 for soiling and color measurement. Test results are listed in Table 5. Comparative Example G was also tested according to Test Method 3 for freeze thaw stability and results are listed in Table 5.

Examples 12 and 13

Soil resist compositions of Examples 12 and 13 were prepared by blending 1) 4% of a polyfluoro organic compound having at least one urethane or urea which was dispersed with 0.26% anionic surfactant, 2) 1.5% of 1,3-propanediol for Example 12 or 2.5% of 1,3-propanediol for Example 13, 3) 2% polymethylmethacrylate, 4) 0.7% carboxylated polymer available as ZELAN 338 from E.I. du Pont de Nemours and Company, Wilmington, Del., 5) 0.7% additional anionic surfactant, and 6) 0.3% citric acid. The polyfluoro organic compound employed was that of example 1 and was prepared as in Example 1. The propanediol employed for this example was a bio-based 1,3-propanediol, sold under the tradename SUSTERRA, commercially available from DuPont Tate & Lyle, Wilmington, Del. The surfactant employed was anionic surfactant alpha olefin sulfonate and Witcolate WAQE, commercially available from Witco, Houston, Tex. The compositions of Examples 12 and 13 were tested according to Test Method 3 for freeze thaw stability and results are listed in Table 5.

Examples 14 and 15

Soil resist compositions of Examples 14 and 15 were prepared by blending 1) 4% of a polyfluoro organic compound having at least one urethane or urea which was dispersed with 0.26% anionic surfactant, 2) 5% of 1,3-propanediol for example 14 or 1% of 1,3-propanediol for example 15, 3) 2% polymethylmethacrylate, 4) 0.7% carboxylated polymer available as ZELAN 338 from E.I. du Pont de Nemours and Company, Wilmington, Del., 5) 0.7% additional anionic surfactant, and 6) 0.3% citric acid. The polyfluoro organic compound employed was that of Example 1 and was prepared as described in Example 1. The propanediol employed for this example was a bio-based 1,3-propanediol, sold under the tradename SUSTERRA, commercially available from DuPont Tate & Lyle, Wilmington, Del. The surfactants employed were anionic surfactant alpha olefin sulfonate and Witcolate WAQE, commercially available from Witco, Houston, Tex. Examples 14 and 15 were applied to a carpet as described above, with a spray application at 25% wpu. The carpet was then air cured. The carpet was tested by Test Methods 1 and 2 for soiling and color measurement and compared against a carpet treated with Comparative Example H, described below. Test results are listed in Table 5. The compositions of Examples 14 and 15 were also tested according to Test Method 3 for freeze thaw stability and results are listed in Table 5.

Comparative Example H

A soil resist composition of Comparative H was prepared by blending 1) 4% of a polyfluoro organic compound having at least one urethane or urea which was dispersed with 0.26% anionic surfactant, 2) 2% polymethylmethacrylate, 3) 0.7% carboxylated polymer available as ZELAN 338 from E.I. du Pont de Nemours and Company, Wilmington, Del., 4) 0.7% additional anionic surfactant, and 5) 0.3% citric acid. Comparative Example H did not contain 1,3-propanediol. The polyfluoro organic compound employed was that of example 1 and was prepared as described in Example 1. The surfactants employed were anionic surfactant alpha olefin sulfonate and Witcolate WAQE, commercially available from Witco, Houston, Tex. Comparative Example H was applied to a carpet as described above, with a spray application at 25% wpu. The carpet was then air cured. The carpet was tested by Test Methods 1 and 2 for soiling and color measurement. Test results are listed in Table 5. The composition of Comparative Example H was also tested according to Test Method 3 for freeze thaw stability and results are listed in Table 5.

TABLE 5

Performance Results

| Ex. # | Delta delta E* | Freeze/thaw stability 1 cycle | Freeze/thaw stability 3 cycles |
|---|---|---|---|
| 10 | −3.6 | Pass | Pass |
| 11 | −2.4 | Pass | Pass |
| Comp G | 0 | Fail | Fail |
| 12 | | Pass | Pass |
| 13 | | Pass | Pass |
| 14 | −3.1 | Pass | Pass |
| 15 | −2.6 | Pass | Pass |
| Comp H | 0 | Fail | Fail |

The data in Table 5 demonstrates that Examples 10-11 and 14015 of the present invention had superior soil resistance to Comparative Examples G and H. Examples 12-17 of the invention provided freeze thaw protection to the soil resist composition, while Comparative Examples G and H, which did not contain 1,3-propanediol failed to provide freeze thaw protection.

What is claimed is:

1. A soil resist composition comprising a) a polyfluoro organic compound having at least one urethane or urea, b) 1,3-propanediol, and c) a surfactant.

2. The soil resist composition of claim 1 wherein the 1,3-propanediol is present from about 1% to about 10% by weight.

3. The soil resist composition of claim 1 wherein the polyfluoro organic compound having at least one urethane or urea is the product of the reaction of: (1) at least one organic polyisocyanate containing at least three isocyanate groups, (2) at least one fluorochemical compound which contains per molecule (a) a single functional group having one or more Zerewitinoff hydrogen atoms and (b) at least two carbon atoms each of which contains at least two fluorine atoms, and (3) water in an amount sufficient to react with from about 5% to about 60% of the isocyanate groups in said polyisocyanate.

4. The soil resist composition of claim 3 wherein for the fluorochemical compound the amount of water is sufficient to react with about 10% to about 35% of said isocyanate groups.

5. The soil resist composition of claim 3 wherein said polyfluoro organo compound which contains a single functional group is represented by the formula:

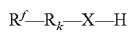

$$R^f - R_k - X - H$$

wherein
$R^f$ is a monovalent aliphatic group containing at least two carbon atoms, each of which is bound to at least two fluorine atoms, and said aliphatic group can be interrupted by at least one oxygen atom;
R is a divalent organic radical;
k is 0 or 1; and
X is —O—, —S—, or —N($R^1$)— wherein $R^1$ is H, alkyl containing 1 to 6 carbon atoms or a $R^f - R_k$ — group.

6. The soil resist composition of claim 5 wherein $R^f$ is a fully fluorinated straight or branched aliphatic group of from about 3 to about 20 carbon atoms.

7. The soil resist composition of claim 5 wherein X is oxygen and $R_k$ is —($CH_2$)$_2$—.

8. The soil resist composition of claim 1 further comprising a non-fluorinated compound of formula

$$R^{10} - R^{11}{}_k - YH$$

wherein
$R^{10}$ is a $C_1$-$C_{18}$ alkyl, a $C_1$-$C_{18}$ omega-alkenyl radical or a $C_1$-$C_{18}$ omega-alkenoyl;
$R^{11}$ is —(OCH$_2$C($R_4$)H)$_p$—, —(OCH$_2$C(CH$_2$Cl)H)$_p$—, or —C($R^5$)($R^6$)—[OCH$_2$C(CH$_2$Cl)H]$_p$— wherein p is 1 to 50, and $R^4$, $R^5$ and $R^6$ are the same or different H or alkyl containing 1 to 6 carbon atoms;
Y is —O—, —S—, or —N($R^7$)— in which $R^7$ is H or alkyl containing 1 to 6 carbon atoms; and
k is 0 or 1.

9. The composition of claim 1 further comprising one or more stain resists, one or more salts, one or more pH adjustment additives or buffers, citric acid, poly methyl methacrylate, or combinations thereof.

10. The soil resist composition of claim 1 wherein the composition is an aqueous dispersion.

* * * * *